US012784409B2

(12) United States Patent
Jin et al.

(10) Patent No.: US 12,784,409 B2
(45) Date of Patent: Nov. 3, 2026

(54) SELF-CALIBRATED PYRAMID NETWORK FOR PILLAR-BASED DETECTOR

(71) Applicant: QUALCOMM Incorporated, San Diego, CA (US)

(72) Inventors: Youngsaeng Jin, Seoul (KR); Sanghyuk Lee, Seoul (KR); Seok-Soo Hong, Seoul (KR); Soyeb Noormohammed Nagori, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 18/669,245

(22) Filed: May 20, 2024

(65) Prior Publication Data

US 2025/0265818 A1 Aug. 21, 2025

Related U.S. Application Data

(60) Provisional application No. 63/554,765, filed on Feb. 16, 2024.

(51) Int. Cl.

| | |
|---|---|
| ***G06V 10/77*** | (2022.01) |
| ***G06V 10/82*** | (2022.01) |
| ***G06V 20/58*** | (2022.01) |
| ***G06V 20/64*** | (2022.01) |

(52) U.S. Cl.
CPC .......... *G06V 10/7715* (2022.01); *G06V 10/82* (2022.01); *G06V 20/58* (2022.01); *G06V 20/64* (2022.01)

(58) Field of Classification Search
CPC .... G06V 10/7715; G06V 10/82; G06V 20/58; G06V 20/64
See application file for complete search history.

(56) References Cited

U.S. PATENT DOCUMENTS

| | | | | |
|---|---|---|---|---|
| 2021/0089807 | A1* | 3/2021 | Liu | G06V 20/70 |
| 2022/0058429 | A1* | 2/2022 | Zou | G06V 10/454 |
| 2022/0180131 | A1* | 6/2022 | Oblak | G06F 18/251 |
| 2022/0215558 | A1* | 7/2022 | Liu | G06T 7/13 |
| 2023/0072682 | A1* | 3/2023 | Jeong | G01S 17/08 |
| 2024/0161262 | A1* | 5/2024 | Nouranian | E02F 9/261 |
| 2025/0029240 | A1* | 1/2025 | Kushnarev | G06T 7/12 |

OTHER PUBLICATIONS

Zhou et al. AFPNet: A 3D fully convolutional neural network with atrous-convolution feature pyramid for brain tumor segmentation via MRI images.Neurocomputing 402 (2020) 235-244 (Year: 2020).*

* cited by examiner

*Primary Examiner* — Kenny A Cese
(74) *Attorney, Agent, or Firm* — Polsinelli

(57) ABSTRACT

Techniques and systems are provided for object detection. For instance, a process can include receiving a set of 3D features, wherein the set of 3D features are generated based on an obtained 3D point cloud; downsampling the set of 3D features; pooling the downsampled set of 3D features based on Atrous Spatial Pyramid Pooling (ASPP) to generate a pooled set of 3D features; upsampling the pooled set of 3D features to generate a upsampled pooled set of 3D features; predicting bounding boxes based on the upsampled pooled set of 3D features; and outputting the predicted bounding boxes.

20 Claims, 13 Drawing Sheets

SELF-CALIBRATED PYRAMID NETWORK FOR PILLAR-BASED DETECTOR

CROSS-REFERENCE TO RELATED APPLICATIONS

This application claims the benefit of U.S. Provisional Patent Application No. 63/554,765, filed Feb. 16, 2024, which is hereby incorporated by reference, in its entirety and for all purposes.

FIELD

The present disclosure generally relates to resource management for an advanced driver assistance system (ADAS). For example, aspects of the present disclosure are related to systems and techniques for a resources manager for an ADAS perception system.

BACKGROUND

Many devices or systems (e.g., autonomous vehicles, such as autonomous and semi-autonomous vehicles, drones or unmanned aerial vehicles (UAVs), mobile robots, mobile devices such as mobile phones, extended reality (XR) devices, and other suitable devices or systems) include multiple sensors to gather information about an environment. Such devices or systems may also include processing systems to process the sensor information for various purposes, such as route planning, navigation, collision avoidance, etc.

One example of a processing system is a perception system for devices. Perception systems may receiving data, such as from sensor of a device, and process the data to determine information (e.g., perceiving) about an environment around the device. In some cases, perception system may include object detection, such as 3-dimensional (3D) object detection. Generally, 3D object detection may be computer vision task for identifying and localizing objects in a 3D space. Techniques to improve 3D object detection may thus be useful to improve a device's ability to perceive the surrounding environment.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In one illustrative example, an apparatus for object detection is provided. The apparatus includes at least one memory and at least one processor (e.g., configured in circuitry) coupled to the at least one memory. The at least one processor is configured to: receive a set of 3D features, wherein the set of 3D features are generated based on an obtained 3D point cloud; downsample the set of 3D features; pool the downsampled set of 3D features based on Atrous Spatial Pyramid Pooling (ASPP) to generate a pooled set of 3D features; upsample the pooled set of 3D features to generate a upsampled pooled set of 3D features; predict bounding boxes based on the upsampled pooled set of 3D features; and output the predicted bounding boxes.

As another example, a method for object detection is provided. The method includes: receiving a set of 3D features, wherein the set of 3D features are generated based on an obtained 3D point cloud; downsampling the set of 3D features; pooling the downsampled set of 3D features based on Atrous Spatial Pyramid Pooling (ASPP) to generate a pooled set of 3D features; upsampling the pooled set of 3D features to generate a upsampled pooled set of 3D features; predicting bounding boxes based on the upsampled pooled set of 3D features; and outputting the predicted bounding boxes.

In another example, a non-transitory computer-readable medium is provided. The non-transitory computer-readable medium includes instructions stored thereon, and the instructions, when executed by at least one processor, cause the at least one processor to: receive a set of 3D features, wherein the set of 3D features are generated based on an obtained 3D point cloud; downsample the set of 3D features; pool the downsampled set of 3D features based on Atrous Spatial Pyramid Pooling (ASPP) to generate a pooled set of 3D features; upsample the pooled set of 3D features to generate a upsampled pooled set of 3D features; predict bounding boxes based on the upsampled pooled set of 3D features; and output the predicted bounding boxes.

As another example, an apparatus for object detection is provided. The apparatus includes means for receiving a set of 3D features, wherein the set of 3D features are generated based on an obtained 3D point cloud; means for downsampling the set of 3D features; means for pooling the downsampled set of 3D features based on Atrous Spatial Pyramid Pooling (ASPP) to generate a pooled set of 3D features; means for upsampling the pooled set of 3D features to generate a upsampled pooled set of 3D features; means for predicting bounding boxes based on the upsampled pooled set of 3D features; and means for outputting the predicted bounding boxes.

In some aspects, the apparatus is, is part of, and/or includes a vehicle or a computing device or component of a vehicle (e.g., an autonomous vehicle), a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus(es) includes at least one camera for capturing one or more images or video frames. For example, the apparatus(es) can include a camera (e.g., an RGB camera) or multiple cameras for capturing one or more images and/or one or more videos including video frames. In some aspects, the apparatus further includes a display for displaying one or more images, notifications, and/or other displayable data. In some aspects, the apparatuses described above can include one or more sensors (e.g., one or more inertial measurement units (IMUs)), such as one or more gyrometers, one or more accelerometers, any combination thereof, and/or other sensor for obtaining information about the environment, such as a lidar, radar, etc. In some aspects, the at least one processor includes a neural processing unit (NPU), a neural signal processor (NSP), a central processing unit (CPU), a graphics processing unit (GPU), any combination thereof, and/or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1A:
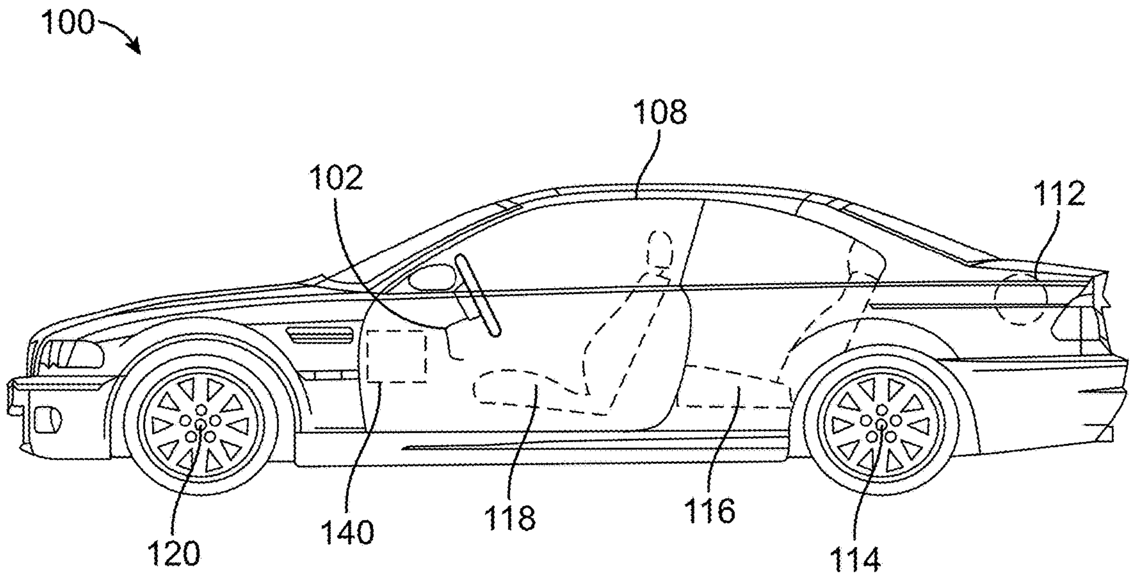
FIGS. 1A and 1B are block diagrams illustrating a vehicle suitable for implementing various techniques described herein, in accordance with aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Many devices or systems (e.g., vehicles, extended reality (XR) systems such as augmented reality (AR), virtual reality (VR), and/or mixed reality (MR) systems, robotic systems, etc.) utilize sensors to obtain information about an environment around the devices or systems. For example, an autonomous (e.g., semi-autonomous and/or fully autonomous) vehicle can use sensors to obtain information about an environment around the vehicle to help the vehicle navigate the environment. In another example, an extended reality (XR) system (e.g., an augmented reality (AR), virtual reality (VR), and/or mixed reality (MR) system) system can use sensors to obtain information in an environment of the XR system. A processing system of such a device or system (e.g., a vehicle such as an ego vehicle, an XR system, a robotic system, etc.) may be used to process the information for one or more operations, such as localization, route planning, navigation, collision avoidance, among others. For example, in some cases, the sensor data may be obtained from the one or more sensor (e.g., one or more images captured from one or more cameras, depth information captured or determined by one or more radar and/or lidar sensors, etc.), transformed, and analyzed to detect objects by one or more perception systems.

As a part of perceiving the environment, a device may perform three-dimensional (3D) object detection. Based on sensor data, objects may be detected and localized, such as by using a bounding box. In some cases, a 3D point cloud, such as one generated using lidar/radar data, may be divided into 2D pillars (e.g., where a pillar may be based on a dimension, such as distance) and object detection performed based on these 2D pillars to increase computational efficiency. However, these pillar-based techniques may sacrifice accuracy as compared to voxel-based techniques as existing pillar-based techniques may potentially not perform well with objects at multiple scales. In some cases, it may be useful to incorporate a self-calibrated pyramid network with a pillar based network to perform 3D object detection.

Systems and techniques are described that provide a self-calibrated pyramid network for pillar-based detection. In some cases, a self-calibrated pyramid network (SCPyramid net) may be added to pillar-based detection to enlarge a receptive field at multiple scales using a pyramid network and perform channel-wise and spatial wise attention to capture elements that may otherwise be missed. In some cases, an atrous spatial pyramid pooling (ASPP) block may be used as a part of a squeeze-and-excitation block in a SC-pyramid block (e.g., SCPyramid net) to provide the pyramid network and perform channel-wise and spatial wise attention.

Various aspects of the application will be described with respect to the figures.

Figure 1B:
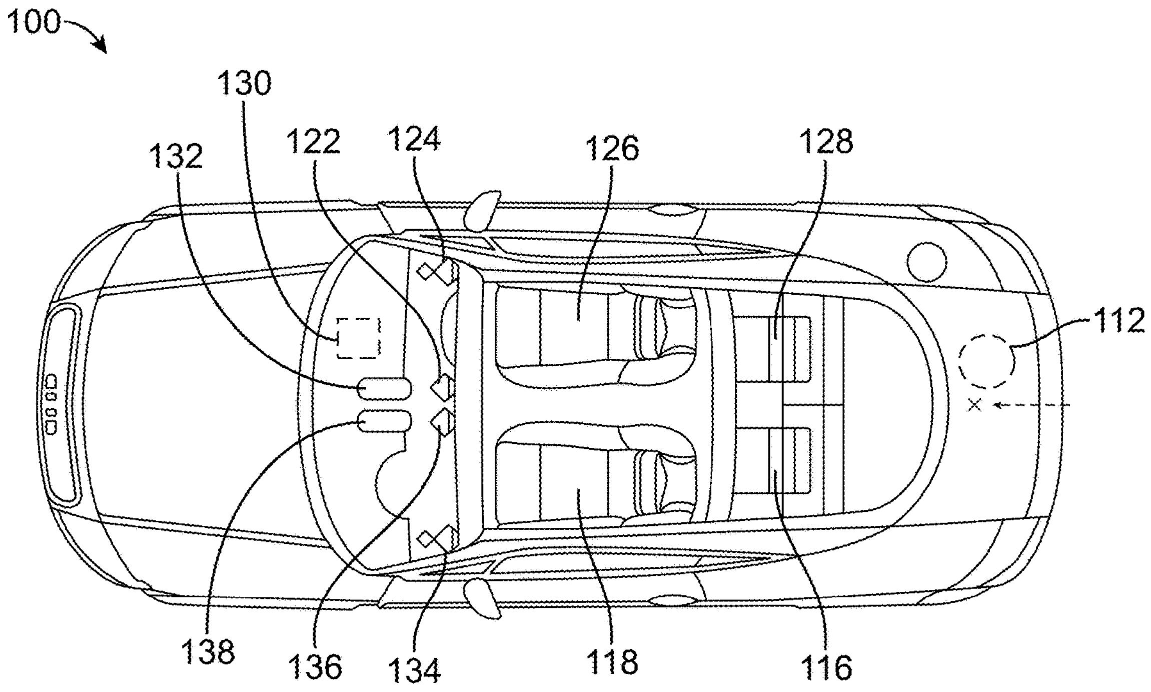

The systems and techniques described herein may be implemented by any type of system or device. One illustrative example of a system that can be used to implement the systems and techniques described herein is a vehicle (e.g., an autonomous or semi-autonomous vehicle) or a system or component (e.g., an ADAS or other system or component) of the vehicle. FIGS. 1A and 1B are diagrams illustrating an example vehicle 100 that may implement the systems and techniques described herein. With reference to FIGS. 1A and 1B, a vehicle 100 may include a control unit 140 and a plurality of sensors 102-138, including satellite geopositioning system receivers (e.g., sensors) 108, occupancy sensors 112, 116, 118, 126, 128, tire pressure sensors 114, 120, cameras 122, 136, microphones 124, 134, impact sensors 130, radar 132, and LIDAR 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, LIDAR 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured with processor-executable instructions to perform various aspects using information received from various sensors, particularly the cameras 122, 136, radar 132, and LIDAR 138. In some aspects, the control unit 140 may supplement the processing of camera images using distance and relative position information (e.g., relative bearing angle) that may be obtained from radar 132 and/or LIDAR 138 sensors. The control unit 140 may further be configured to control steering, breaking and speed of the vehicle 100 when operating in an autonomous or semi-autonomous mode using information regarding other vehicles determined using various aspects.

Figure 1C:
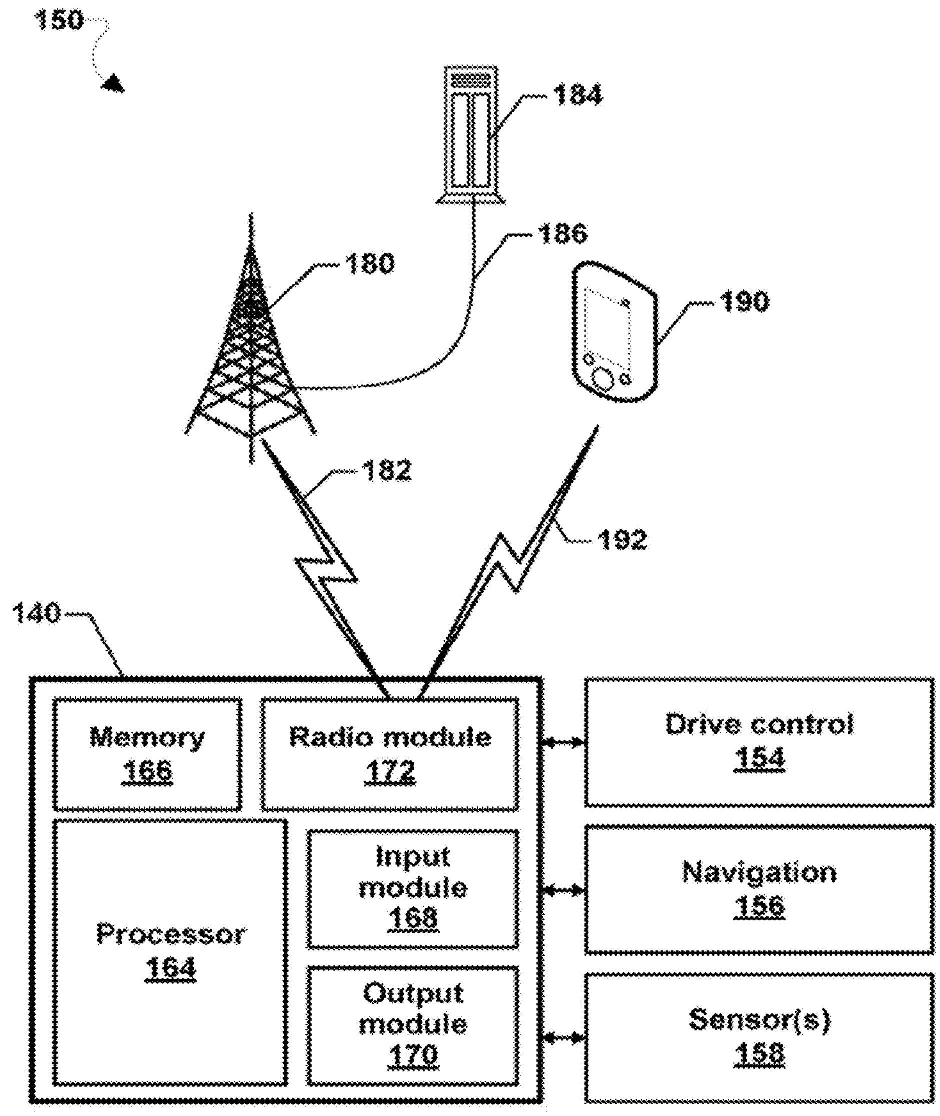
FIG. 1C is a block diagram illustrating components of a vehicle suitable for implementing various techniques described herein, in accordance with aspects of the present disclosure.

FIG. 1C is a component block diagram illustrating a system 150 of components and support systems suitable for implementing various aspects. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100.

The control unit 140 may include a processor 164 that may be configured with processor-executable instructions to control maneuvering, navigation, and/or other operations of the vehicle 100, including operations of various aspects. The processor 164 may be coupled to the memory 166. The control unit 140 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a network node 180, and may provide the signals 182 to the processor 164 and/or the navigation components 156. In some aspects, the radio module 172 may enable the vehicle 100 to communicate with a wireless communication device 190 through a wireless communication link 92. The wireless communication link 92 may be a bidirectional or unidirectional communication link and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, other control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156 and may receive data from the navigation components 156. The control unit 140 may be configured to use such data to determine the present position and orientation of the vehicle 100, as well as an appropriate course toward a destination. In various aspects, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control components 154, the processor 164 may control the vehicle 100 to navigate and maneuver. The processor 164 and/or the navigation components 156 may be configured to communicate with a server 184 on a network 186 (e.g., the Internet) using wireless signals 182 exchanged over a cellular data network via network node 180 to receive commands to control maneuvering, receive data useful in navigation, provide real-time position reports, and assess other data.

The control unit 140 may be coupled to one or more sensors 158. The sensor(s) 158 may include the sensors 102-138 as described and may be configured to provide a variety of data to the processor 164 and/or the navigation components 156. For example, the control unit 140 may aggregate and/or process data from the sensors 158 to produce information the navigation components 156 may use for localization. As a more specific example, the control unit 140 may process images from multiple camera sensors to generate a single semantically segmented image for the navigation components 156. As another example, the control unit 140 may generate a fused point clouds from LIDAR and radar data for the navigation components 156.

While the control unit 140 is described as including separate components, in some aspects some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various aspects when installed into a vehicle.

Figure 1D:
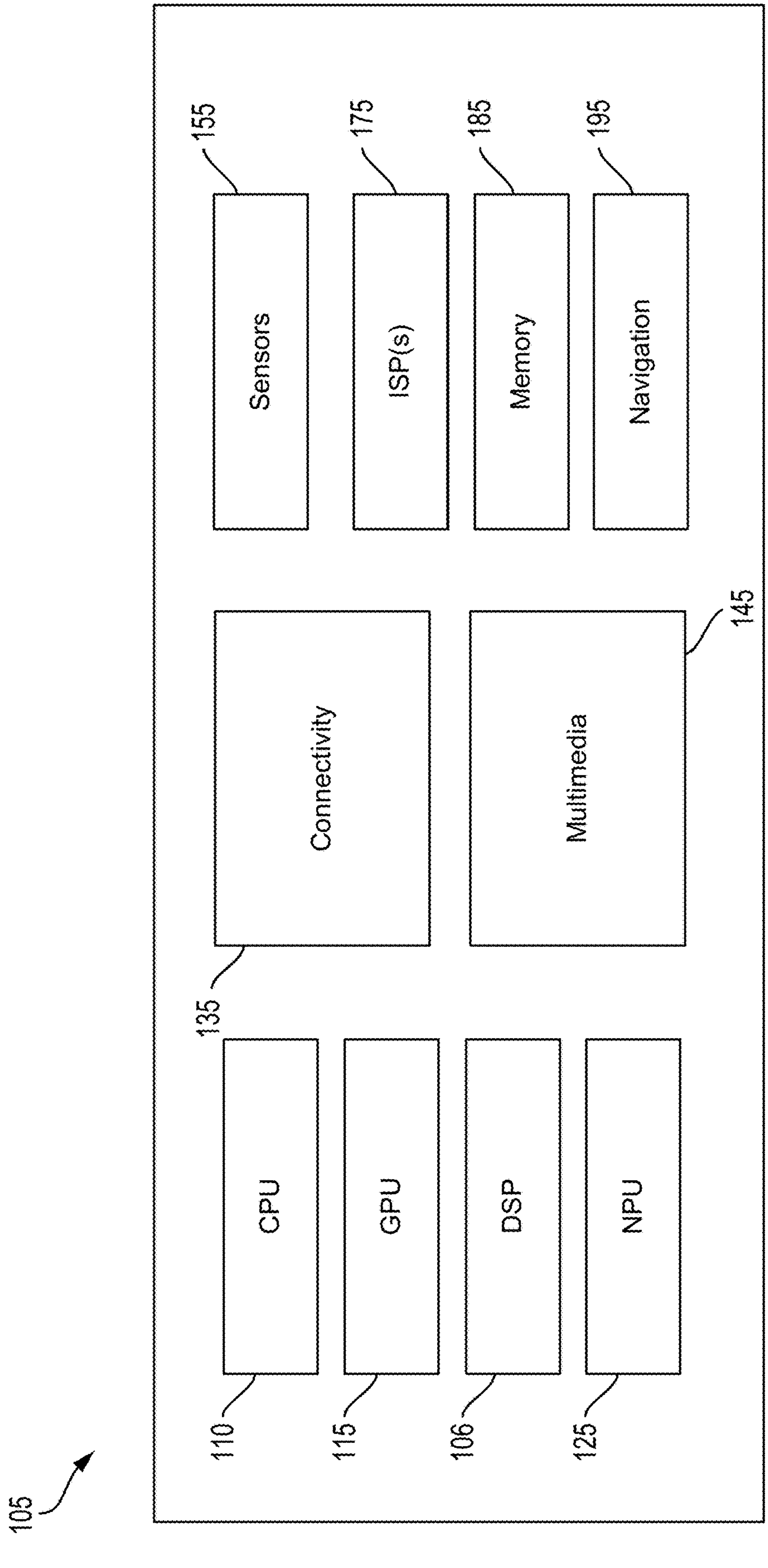
FIG. 1D illustrates an example implementation of a system-on-a-chip (SOC), in accordance with some examples.

FIG. 1D illustrates an example implementation of a system-on-a-chip (SOC) 105, which may include a central processing unit (CPU) 110 or a multi-core CPU, configured to perform one or more of the functions described herein. In some cases, the SOC 105 may be based on an ARM instruction set. In some cases, CPU 110 may be similar to processor 164. Parameters or variables (e.g., neural signals and synaptic weights), system parameters associated with a computational device (e.g., neural network with weights), delays, frequency bin information, task information, among other information may be stored in a memory block associated with a neural processing unit (NPU) 125, in a memory block associated with a CPU 110, in a memory block associated with a graphics processing unit (GPU) 115, in a memory block associated with a digital signal processor (DSP) 106, in a memory block 185, and/or may be distributed across multiple blocks. Instructions executed at the CPU 110 may be loaded from a program memory associated with the CPU 110 or may be loaded from a memory block 185.

The SOC 105 may also include additional processing blocks tailored to specific functions, such as a GPU 115, a DSP 106, a connectivity block 135, which may include fifth generation (5G) connectivity, fourth generation long term evolution (4G LTE) connectivity, Wi-Fi connectivity, USB connectivity, Bluetooth connectivity, and the like, and a multimedia processor 145 that may, for example, detect and recognize gestures. In one implementation, the NPU is implemented in the CPU 110, DSP 106, and/or GPU 115. The SOC 105 may also include a sensor processor 155, image signal processors (ISPs) 175, and/or navigation module 195, which may include a global positioning system. In some cases, the navigation module 195 may be similar to navigation components 156 and sensor processor 155 may accept input from, for example, one or more sensors 158. In some cases, the connectivity block 135 may be similar to the radio module 172.

Figure 2A:
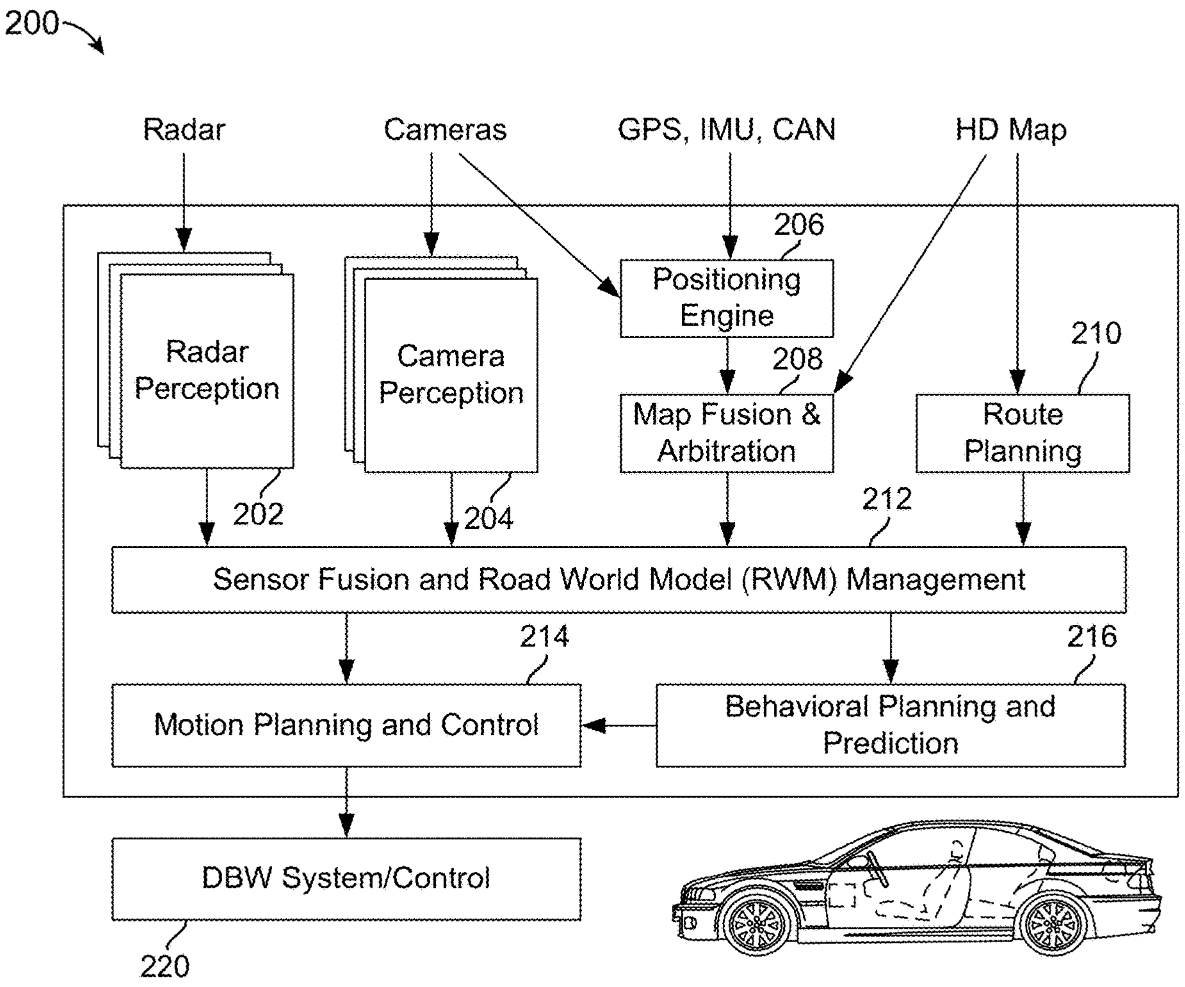
FIG. 2A is a component block diagram illustrating components of an example vehicle management system, in accordance with aspects of the present disclosure.

FIG. 2A illustrates an example of vehicle applications, subsystems, computational elements, or units within a vehicle management system 200, which may be utilized within a vehicle, such as vehicle 100 of FIG. 1A. With reference to FIGS. 1A-2A, in some aspects, the various vehicle applications, computational elements, or units within vehicle management system 200 may be implemented within a system of interconnected computing devices (i.e., subsystems), that communicate data and commands to each other. In other aspects, the vehicle management system 200 may be implemented as a plurality of vehicle applications executing within a single computing device, such as separate threads, processes, algorithms, or computational elements. However, the use of the term vehicle applications in describing various aspects are not intended to imply or require that the corresponding functionality is implemented within a single autonomous (or semi-autonomous) vehicle management system computing device, although that is a potential implementation aspect. Rather the use of the term vehicle applications is intended to encompass subsystems with independent processors, computational elements (e.g., threads, algorithms, subroutines, etc.) running in one or more computing devices, and combinations of subsystems and computational elements.

In various aspects, the vehicle applications executing in a vehicle management system 200 may include (but is not limited to) a radar perception vehicle application 202, a camera perception vehicle application 204, a positioning engine vehicle application 206, a map fusion and arbitration vehicle application 208, a route vehicle planning application 210, sensor fusion and road world model (RWM) management vehicle application 212, motion planning and control vehicle application 214, and behavioral planning and prediction vehicle application 216. The vehicle applications 202-216 are merely examples of some vehicle applications in one example configuration of the vehicle management system 200. In other configurations consistent with various aspects, other vehicle applications may be included, such as additional vehicle applications for other perception sensors (e.g., LIDAR perception layer, etc.), additional vehicle applications for planning and/or control, additional vehicle applications for modeling, etc., and/or certain of the vehicle applications 202-216 may be excluded from the vehicle management system 200. Each of the vehicle applications 202-216 may exchange data, computational results and commands.

The vehicle management system 200 may receive and process data from sensors (e.g., radar, LIDAR, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system 200 may output vehicle control commands or signals to the drive by wire (DBW) system/control unit 220, which is a system, subsystem or computing device that interfaces directly with vehicle steering, throttle and brake controls. The configuration of the vehicle management system 200 and DBW system/control unit 220 illustrated in FIG. 2A is merely an example configuration and other configurations of a vehicle management system and other vehicle components may be used in the various aspects. As an example, the configuration of the vehicle management system 200 and DBW system/control unit 220 illustrated in FIG. 2A may be used in a vehicle configured for autonomous or semi-autonomous operation while a different configuration may be used in a non-autonomous vehicle.

The radar perception vehicle application 202 may receive data from one or more detection and ranging sensors, such as radar (e.g., 132) and/or LIDAR (e.g., 138), and process the data to recognize and determine locations of other vehicles and objects within a vicinity of the vehicle 100. The radar perception vehicle application 202 may include use of neural network processing and artificial intelligence methods to recognize objects and vehicles, and pass such information on to the sensor fusion and RWM management vehicle application 212.

The camera perception vehicle application 204 may receive data from one or more cameras, such as cameras (e.g., 122, 136), and process the data to recognize and determine locations of other vehicles and objects within a vicinity of the vehicle 100. The camera perception vehicle application 204 may include use of neural network processing and artificial intelligence methods to recognize objects and vehicles and pass such information on to the sensor fusion and RWM management vehicle application 212.

The positioning engine vehicle application 206 may receive data from various sensors and process the data to determine a position of the vehicle 100. The various sensors may include, but is not limited to, GPS sensor, an IMU, and/or other sensors connected via a CAN bus. The positioning engine vehicle application 206 may also utilize inputs from one or more cameras, such as cameras (e.g., 122, 136) and/or any other available sensor, such as radars, LIDARs, etc.

The map fusion and arbitration vehicle application 208 may access data within a high-definition (HD) map database and receive output received from the positioning engine vehicle application 206 and process the data to further determine the position of the vehicle 100 within the map, such as location within a lane of traffic, position within a street map, etc., using localization. The HD map database may be stored in a memory (e.g., memory 166). For example, the map fusion and arbitration vehicle application 208 may convert latitude and longitude information from GPS into locations within a surface map of roads contained in the HD map database. GPS position fixes include errors, so the map fusion and arbitration vehicle application 208 may function to determine a best guess location of the vehicle 100 within a roadway based upon an arbitration between the GPS coordinates and the HD map data. For example, while GPS coordinates may place the vehicle 100 near the middle of a two-lane road in the HD map, the map fusion and arbitration vehicle application 208 may determine from the direction of travel that the vehicle 100 is most likely aligned with the travel lane consistent with the direction of travel. The map fusion and arbitration vehicle application 208 may pass map-based location information to the sensor fusion and RWM management vehicle application 212.

The route planning vehicle application 210 may utilize the HD map, as well as inputs from an operator or dispatcher to plan a route to be followed by the vehicle 100 to a particular destination. The route planning vehicle application 210 may pass map-based location information to the sensor fusion and RWM management vehicle application 212. However, the use of a prior map by other vehicle applications, such as the sensor fusion and RWM management vehicle application 212, etc., is not required. For example, other stacks may operate and/or control the vehicle based on perceptual data alone without a provided map, constructing lanes, boundaries, and the notion of a local map as perceptual data is received.

The sensor fusion and RWM management vehicle application 212 may receive data and outputs produced by one or more of the radar perception vehicle application 202, camera perception vehicle application 204, map fusion and arbitration vehicle application 208, and route planning vehicle application 210, and use some or all of such inputs to estimate or refine the location and state of the vehicle 100 in relation to the road, other vehicles on the road, and other objects within a vicinity of the vehicle 100. For example, the sensor fusion and RWM management vehicle application 212 may combine imagery data from the camera perception vehicle application 204 with arbitrated map location information from the map fusion and arbitration vehicle application 208 to refine the determined position of the vehicle within a lane of traffic. As another example, the sensor fusion and RWM management vehicle application 212 may combine object recognition and imagery data from the camera perception vehicle application 204 with object detection and ranging data from the radar perception vehicle application 202 to determine and refine the relative position of other vehicles and objects in the vicinity of the vehicle. As another example, the sensor fusion and RWM management vehicle application 212 may receive information from vehicle-to-vehicle (V2V) communications (such as via the CAN bus) regarding other vehicle positions and directions of travel and combine that information with information from the radar perception vehicle application 202 and the camera perception vehicle application 204 to refine the locations and motions of other vehicles. The sensor fusion and RWM management vehicle application 212 may output refined location and state information of the vehicle 100, as well as refined location and state information of other vehicles and objects in the vicinity of the vehicle, to the motion planning and control vehicle application 214 and/or the behavior planning and prediction vehicle application 216.

As a further example, the sensor fusion and RWM management vehicle application 212 may use dynamic traffic control instructions directing the vehicle 100 to change speed, lane, direction of travel, or other navigational element (s), and combine that information with other received information to determine refined location and state information. The sensor fusion and RWM management vehicle application 212 may output the refined location and state information of the vehicle 100, as well as refined location and state information of other vehicles and objects in the vicinity of the vehicle 100, to the motion planning and control vehicle application 214, the behavior planning and prediction vehicle application 216 and/or devices remote from the vehicle 100, such as a data server, other vehicles, etc., via wireless communications, such as through C-V2X connections, other wireless connections, etc.

As a still further example, the sensor fusion and RWM management vehicle application 212 may monitor perception data from various sensors, such as perception data from a radar perception vehicle application 202, camera perception vehicle application 204, other perception vehicle application, etc., and/or data from one or more sensors themselves to analyze conditions in the vehicle sensor data. The sensor fusion and RWM management vehicle application 212 may be configured to detect conditions in the sensor data, such as sensor measurements being at, above, or below a threshold, certain types of sensor measurements occurring, etc., and may output the sensor data as part of the refined location and state information of the vehicle 100 provided to the behavior planning and prediction vehicle application 216 and/or devices remote from the vehicle 100, such as a data server, other vehicles, etc., via wireless communications, such as through C-V2X connections, other wireless connections, etc.

The refined location and state information may include vehicle descriptors associated with the vehicle 100 and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction vehicle application 216 of the autonomous vehicle system 200 may use the refined location and state information of the vehicle 100 and location and state information of other vehicles and objects output from the sensor fusion and RWM management vehicle application 212 to predict future behaviors of other vehicles and/or objects. For example, the behavioral planning and prediction vehicle application 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction vehicle application 216 may output other vehicle and object behavior and location predictions to the motion planning and control vehicle application 214.

Additionally, the behavior planning and prediction vehicle application 216 may use object behavior in combination with location predictions to plan and generate control signals for controlling the motion of the vehicle 100. For example, based on route planning information, refined location in the roadway information, and relative locations and motions of other vehicles, the behavior planning and prediction vehicle application 216 may determine that the vehicle 100 needs to change lanes and accelerate, such as to maintain or achieve minimum spacing from other vehicles, and/or prepare for a turn or exit. As a result, the behavior planning and prediction vehicle application 216 may calculate or otherwise determine a steering angle for the wheels and a change to the throttle setting to be commanded to the motion planning and control vehicle application 214 and DBW system/control unit 220 along with such various parameters necessary to effectuate such a lane change and acceleration. One such parameter may be a computed steering wheel command angle.

The motion planning and control vehicle application 214 may receive data and information outputs from the sensor fusion and RWM management vehicle application 212 and other vehicle and object behavior as well as location predictions from the behavior planning and prediction vehicle application 216, and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control vehicle application 214 may verify and pass various control commands or instructions to the DBW system/control unit 220.

The DBW system/control unit 220 may receive the commands or instructions from the motion planning and control vehicle application 214 and translate such information into mechanical control signals for controlling wheel angle, brake, and throttle of the vehicle 100. For example, DBW system/control unit 220 may respond to the computed steering wheel command angle by sending corresponding control signals to the steering wheel controller.

In various aspects, the vehicle management system 200 may include functionality that performs safety checks or oversight of various commands, planning or other decisions of various vehicle applications that could impact vehicle and occupant safety. Such safety checks or oversight functionality may be implemented within a dedicated vehicle application or distributed among various vehicle applications and included as part of the functionality. In some aspects, a variety of safety parameters may be stored in memory, and the safety checks or oversight functionality may compare a determined value (e.g., relative spacing to a nearby vehicle, distance from the roadway centerline, etc.) to corresponding safety parameter(s) and may issue a warning or command if the safety parameter is or will be violated. For example, a safety or oversight function in the behavior planning and prediction vehicle application 216 (or in a separate vehicle application) may determine the current or future separate distance between another vehicle (as refined by the sensor fusion and RWM management vehicle application 212) and the vehicle 100 (e.g., based on the world model refined by the sensor fusion and RWM management vehicle application 212), compare that separation distance to a safe separation distance parameter stored in memory, and issue instructions to the motion planning and control vehicle application 214 to speed up, slow down or turn if the current or predicted separation distance violates the safe separation distance parameter. As another example, safety or oversight functionality in the motion planning and control vehicle application 214 (or a separate vehicle application) may compare a determined or commanded steering wheel command angle to a safe wheel angle limit or parameter and may issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
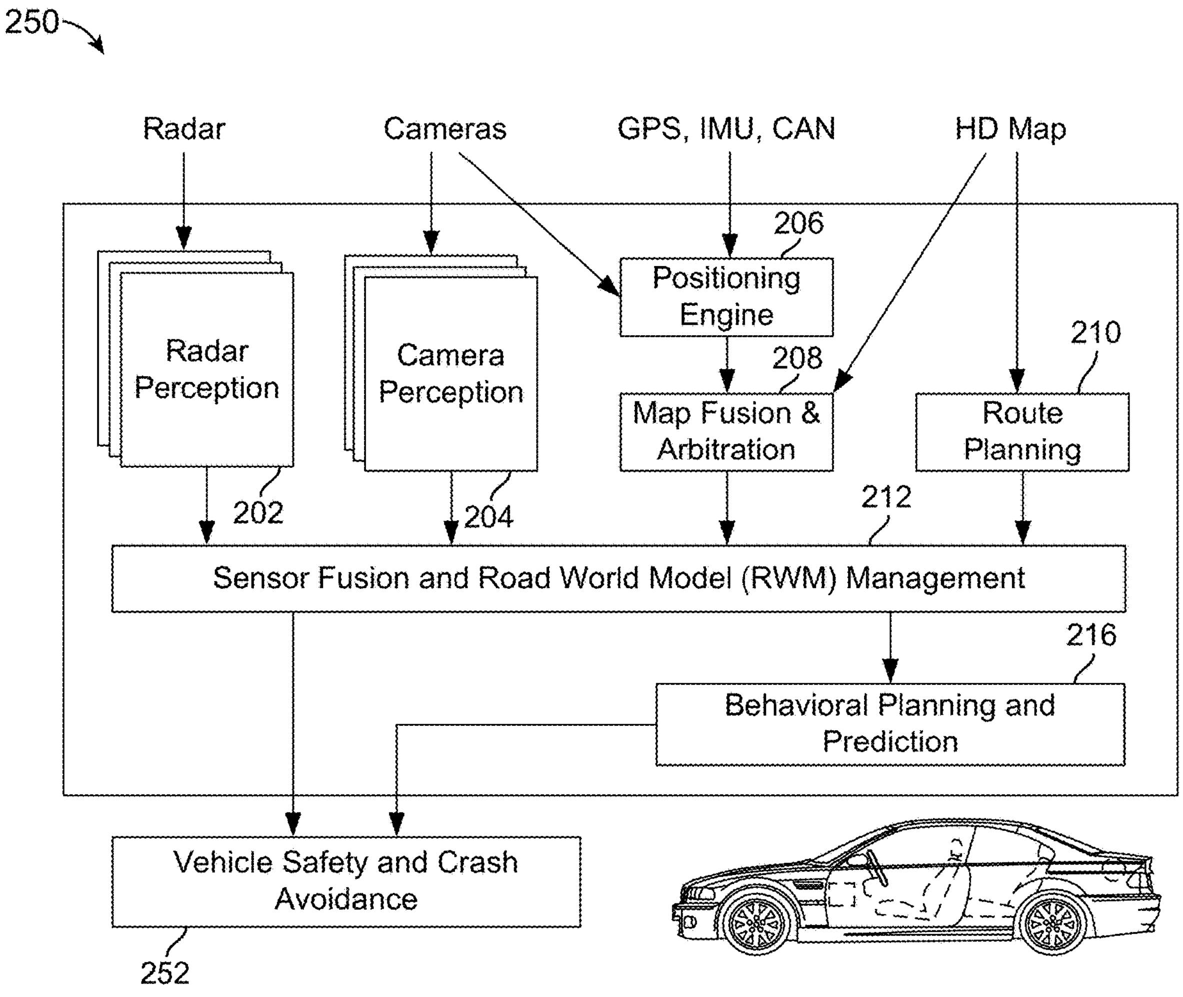
FIG. 2B is a component block diagram illustrating components of another example vehicle management system, in accordance with aspects of the present disclosure.

FIG. 2B illustrates an example of vehicle applications, subsystems, computational elements, or units within a vehicle management system 250, which may be utilized within a vehicle 100. With reference to FIGS. 1A-2B, in some aspects, the vehicle applications 202, 204, 206, 208, 210, 212, and 216 of the vehicle management system 200 may be similar to those described with reference to FIG. 2A and the vehicle management system 250 may operate similar to the vehicle management system 200, except that the vehicle management system 250 may pass various data or instructions to a vehicle safety and crash avoidance system 252 rather than the DBW system/control unit 220. For example, the configuration of the vehicle management system 250 and the vehicle safety and crash avoidance system 252 illustrated in FIG. 2B may be used in a non-autonomous vehicle.

In various aspects, the behavioral planning and prediction vehicle application 216 and/or sensor fusion and RWM management vehicle application 212 may output data to the vehicle safety and crash avoidance system 252. For example, the sensor fusion and RWM management vehicle application 212 may output sensor data as part of refined location and state information of the vehicle 100 provided to the vehicle safety and crash avoidance system 252. The vehicle safety and crash avoidance system 252 may use the refined location and state information of the vehicle 100 to make safety determinations relative to the vehicle 100 and/or occupants of the vehicle 100. As another example, the behavioral planning and prediction vehicle application 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 100 and/or occupants of the vehicle 100.

In various aspects, the vehicle safety and crash avoidance system 252 may include functionality that performs safety checks or oversight of various commands, planning, or other decisions of various vehicle applications, as well as human driver actions, that could impact vehicle and occupant safety. In some aspects, a variety of safety parameters may be stored in memory and the vehicle safety and crash avoidance system 252 may compare a determined value (e.g., relative spacing to a nearby vehicle, distance from the roadway centerline, etc.) to corresponding safety parameter (s), and issue a warning or command if the safety parameter is or will be violated. For example, a vehicle safety and crash avoidance system 252 may determine the current or future separate distance between another vehicle (as refined by the sensor fusion and RWM management vehicle application 212) and the vehicle (e.g., based on the world model refined by the sensor fusion and RWM management vehicle application 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter and may issue an override command and/or alarm in response to the steering wheel angle exceeding the safe wheel angle limit.

Often, systems may use information about the environment to perform certain tasks. For example, systems that usefully (and in some cases autonomously or semi-autonomously) move through the environment, such as autonomous vehicles or semi-autonomous vehicles, may gather information (e.g., perceive) about the environment in which they operate. Similarly, extended reality (XR) systems or devices may gather information about the environment around them to provide virtual content to a user. This virtual content may combine real-world or physical environments and virtual environments (made up of virtual content) to provide users with XR experiences.

Figure 3:
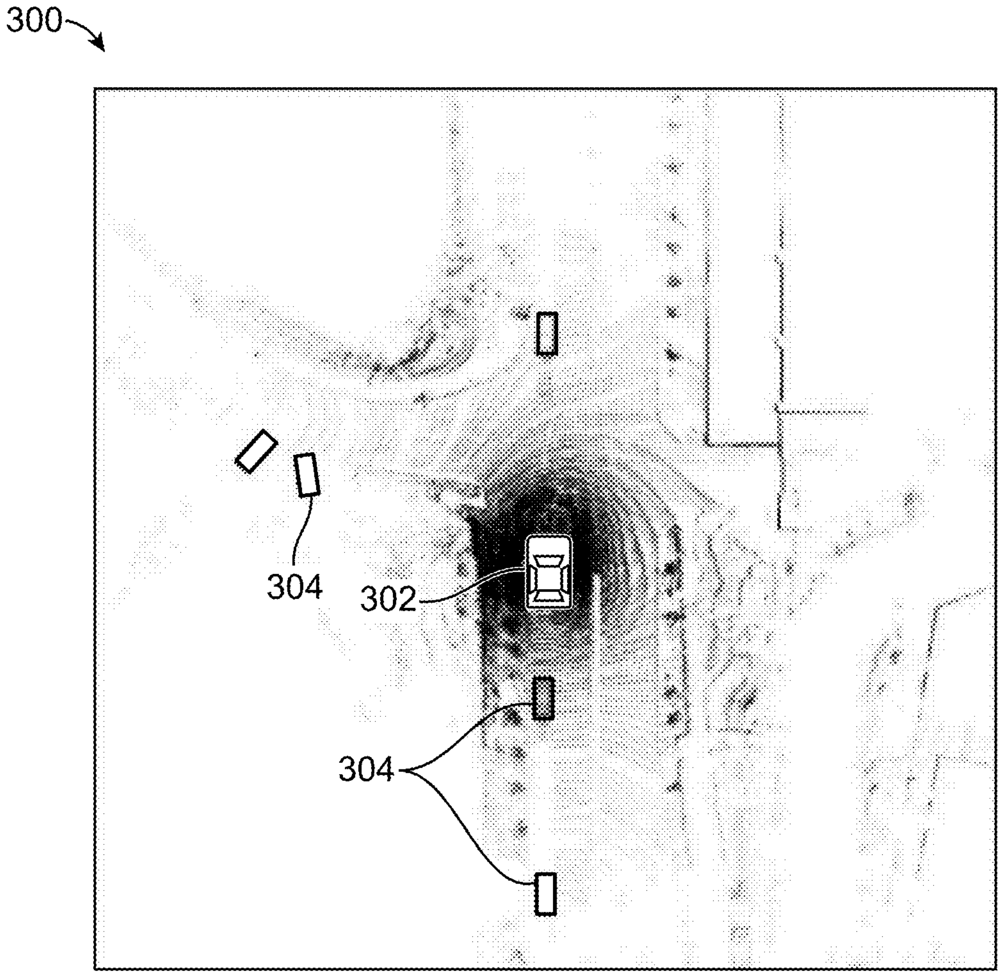
FIG. 3 illustrates 3D object detection, in accordance with aspects of the present disclosure.

As a part of perceiving the environment, a device may perform 3D object detection. FIG. 3 illustrates 3D object detection. In 3D object detection, a device, such as vehicle 302 may sense the environment using a sensor, such as a lidar sensor, to generate a sensor data, such as a 3D point cloud, to capture information about the environment around the device. Based on the sensor data, objects 304 may be detected and localized, such as by using a one or more ML models to generate a bounding box around the objects 304. In some cases, the point cloud may be divided into 3D voxels (x,y,z), and the voxels may be encoded by the lidar encoder to perform 3D object detection. However, such techniques may be relatively computationally inefficient as they are performed on 3D data. In some cases, it may be more computationally efficient to divide a 3D point cloud into 2D pillars and perform object detection based on these 2D pillars to increase computational efficiency. However, these pillar-based techniques may sacrifice accuracy as compared to voxel based techniques as existing pillar-based techniques may potentially not perform well with objects at multiple scales (e.g., due to different distances). In some cases, it may be useful to incorporate a self-calibrated pyramid network with a pillar based network to perform 3D object detection.

Figure 4:
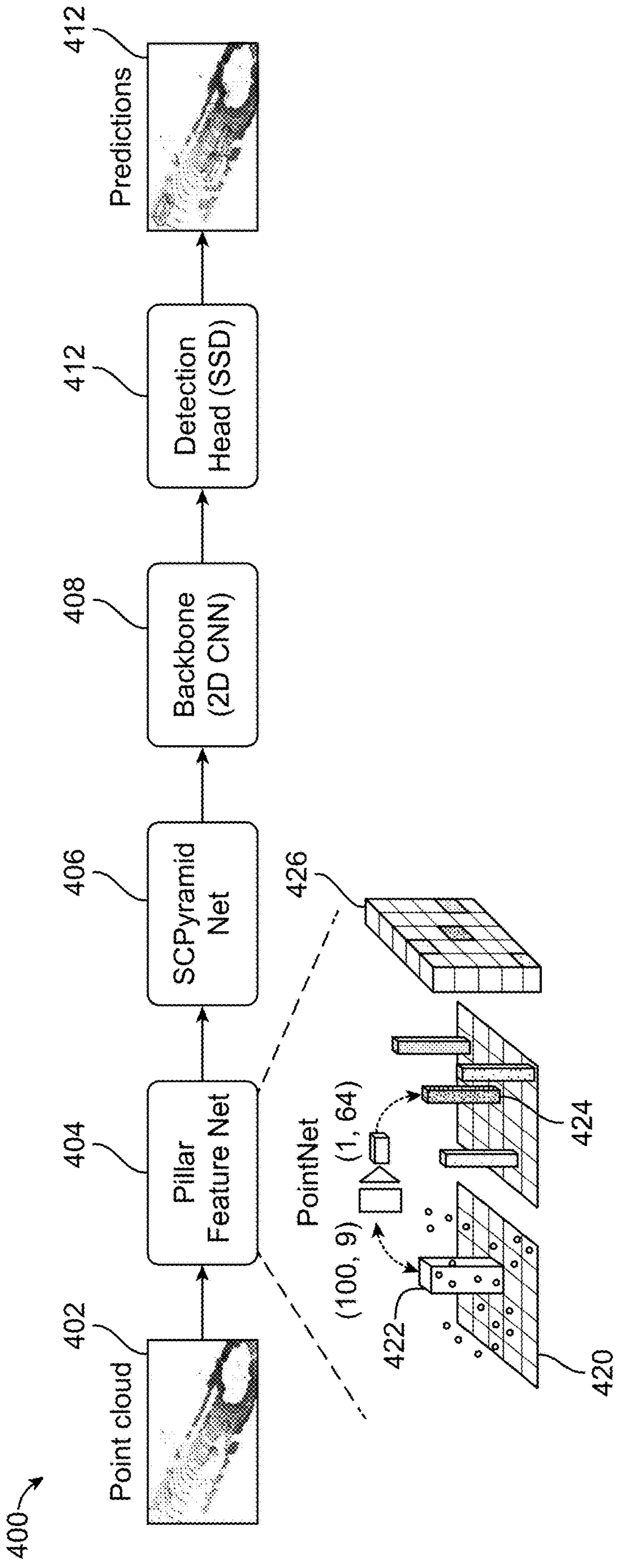
FIG. 4 is a block diagram illustrating a self-calibrated pyramid network for a pillar-based 3D object detector, in accordance with aspects of the present disclosure.

FIG. 4 is a block diagram illustrating a self-calibrated pyramid network for a pillar-based 3D object detector 400, in accordance with aspects of the present disclosure. As shown in FIG. 4, the 3D object detector 400 may receive a point cloud 402, such as a lidar point cloud. The point cloud 402 may be processed by a pillar feature network 404, then by a self-calibrated pyramid network (SCPyramid net 406), then by a backbone 408, and a detection head 410 to generate a prediction 412 of locations of detected objects from the point cloud 402. The pillar feature network 404 may convert the point cloud 402 to a stacked pillar tensor and pillar index tensor and generate features of the pillars. The SCPyramid net 406 may enlarge a receptive field in multiple scales using a pyramid network and perform channel-wise and spatial wise attention to capture elements that may otherwise be missed. The receptive field may refer to a portion of an input set of features (e.g., of the tensor) a portion (e.g., neuron) of the ML network may be able to see for analysis. The backbone 408 may use the pillar features to learn a set of features, and the detection head 410 may use the features learned by the backbone 408 to predict bounding boxes for the prediction 412.

Points in the point cloud 402 may be represented by with coordinates x, y, z and reflectance r. In some cases, to convert the point cloud 402, the pillar feature network 404 may discretize the point cloud 402 into an evenly spaced grid 420 in an x-y plane (e.g., width/height) create a set of pillars. Pillars (e.g., pillar 422) of the set of pillars may be mostly empty due to sparsity of the point cloud, and the non-empty pillars may have few points in them. Points may be augmented based on a value c, which may stand for a distance to an arithmetic mean of all points in the pillar and a value p, which may represent an offset from a center of the pillar, resulting in 9 dimensions for each point. Points in each grid cell (e.g., corresponding to a pillar) may be represented by a single pillar (e.g., pillar 422). Points in a grid cell may be converted into a feature 424. As an example, 100 points with 9-dimensional information may be converted into a 1×64 dimensional feature 424. In some cases, the conversion of the information into a feature 424 may be performed by a ML model such as a deep neural network. For example, the ML model may be based on PointNet and each point may be passed to a linear layer followed by a batch normalization layer and ReLU layer to generate a tensor. The pillar-wise features may then be projected into the W×H BEV grids to obtain a 3D pseudo-image 426 (e.g., 3D bird's eye view (BEV) features of the lidar point cloud). In some cases, the pseudo-image 426 may have a grid along with W/H axis and each pillar may include C number of values, thus the pseudo image may have dimensions of C×W×H.

The pseudo-image 426 may then be input to the SCPyramid net 406. The SCPyramid net 406 may be used to recognize objects at different scales as a single image may contain objects with different scales (as certain objects may be further than others). In some cases, SCPyramid net 406 may be scale-invariant in that an object's scale change is offset by shifting its level in the pyramid. In SCPyramid net 406, the features $F_1, F_2, \ldots, F_N$ from all pyramids $P_1, P_2, \ldots, P_N$ may be concatenated into a single feature Y, where $Y=\text{concat}(F_1, F_2, \ldots, F_N)$, and where $F_n=P_n(X)$, and X comprises the input into the pyramid (e.g., from an average pooling layer, such as average pooling layer 604 of FIG. 6). An attention mechanism may be included in SCPyramid net 406 as the attention mechanism may allow the model to focus on the most relevant parts of the input. For example, lidar sensors may be highly sensitive and easily affected by noise. The attention mechanism may help neglect (e.g., giving less attention weight) to the noise data for non-object areas. The SCPyramid net 406 may be discussed in more detail below.

Output of the SCPyramid net 406 may be input to the backbone 408. In some cases, the backbone 408 may include one or more CNNs operating on 2D data. In some cases, the backbone 408 may include two subnetworks. The first subnetwork may produce features at increasingly small spatial resolution and a second subnetwork may performs upsampling and concatenation of the top-down features to generate output features. The output features may be input to the detection head 410. The detection head 410 may be a single shot detector (SSD) detector head setup to perform 3D object detection trained to match priorboxes (e.g., detected objects) to ground truth images using 2D intersection over union (IoU).

Figure 5:
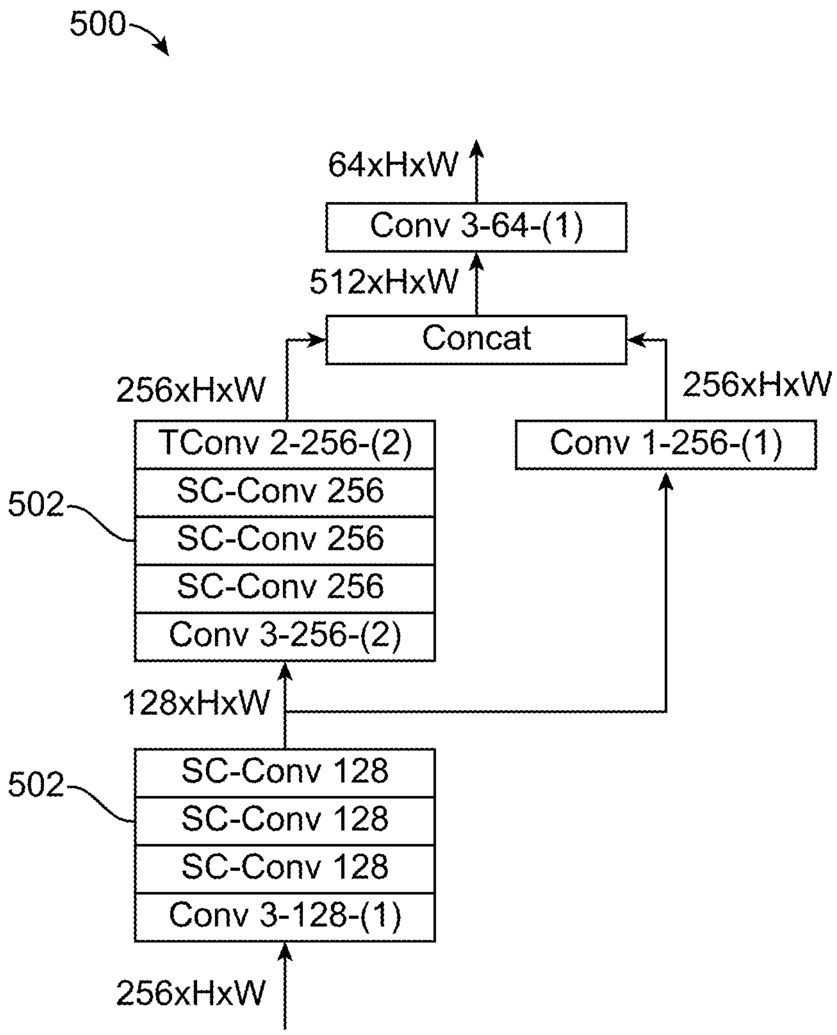
FIG. 5 illustrates a stack of self-calibrated convolution (SC-conv) blocks, in accordance with aspects of the present disclosure.

FIG. 5 is a block diagram 500 illustrating stacks of self-calibrated convolution (SC-conv) blocks. In some cases, pillar-based detectors may include stacked SC-cony blocks 502 following the pillar feature network (e.g., pillar feature network 404), before the backbone (e.g., backbone 408), and/or integrated into the backbone. In some cases, SC-cony blocks 502 may contribute to incorporating richer information and generating more discriminative representations. However, while SC-cony blocks 502 may act to enlarge a receptive field, the SC-cony blocks 502 may have difficulties with multi-scale objects. In some cases, it may be useful to enhance an SC-cony block to better handle objects at different scales. For example, it may be useful to replace the SC-cony block with an SC-pyramid block.

Figure 6:
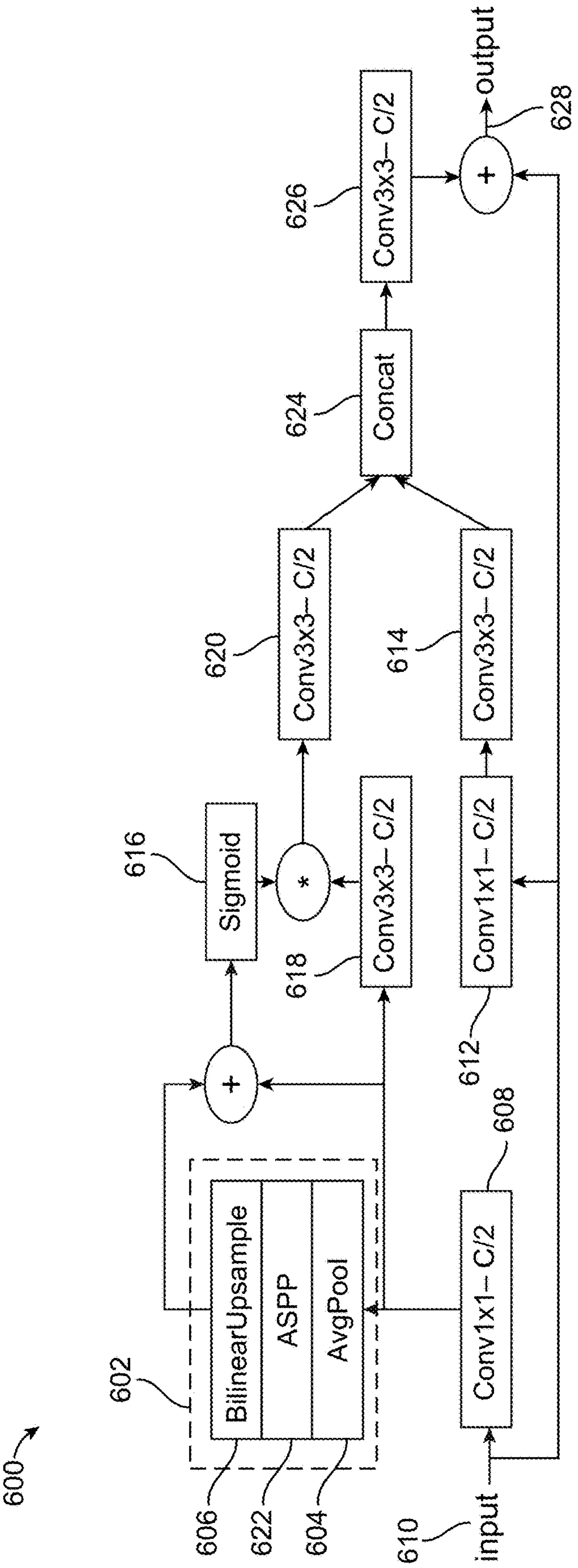
FIG. 6 is a block diagram illustrating an SC-pyramid block, in accordance with aspects of the present disclosure.

FIG. 6 is a block diagram illustrating an SC-pyramid block 600, in accordance with aspects of the present disclosure. In some cases, SC-pyramid block 600, like an SC-cony block, may provide a long-range spatial dependency through an SE (Squeeze-and-Excitation) block 602. Traditionally, an SE block may include an average pooling (AvgPooling) layer 604, followed by a 2D convolution layer, and then an upsampling layer 606 acting on spatially pooled features (e.g., obtained by convolving, via convolution layer 608, the input 610 BEV features of the pseudo image) help to enlarge the receptive field. In some cases, the average pooling layer 604 may downsample a feature map by determining an average value for a portion of feature map and then downsampling (e.g., pooling) the feature map using the average value for that portion of the feature map.

The SC-pyramid block 600 may also apply spatial attention and channel attention (e.g., by multiplying the sigmoid 616 output and a tensor from the convolutional layer 618) to highly rely on important elements. For example, the sigmoid 616 may be applied to tensors from convolution layer 618 to determine which tensors are more relevant and which tensors are less relevant. In some cases, the sigmoid 616 may be used to generate the attention weight as its ranges is from 0 to 1. A smaller weight may then be assigned to less relevant areas. After spatial attention and channel attention are applied, the results may be further encoded (e.g., via concatenation layer 624 and convolutional layers 612, 614, and 626) and output 628 along with the input 610.

In some cases, the SE block 602 of the SC-pyramid block 600 may be enhanced by replacing the convolution layer of a traditional SE block with an atrous spatial pyramid pooling (ASPP) block 622, as shown in SE block 602. In some cases, the ASPP block 622 acts to enlarge the receptive field at different rates with a pyramid structure to help capture different object scales.

Figure 7:
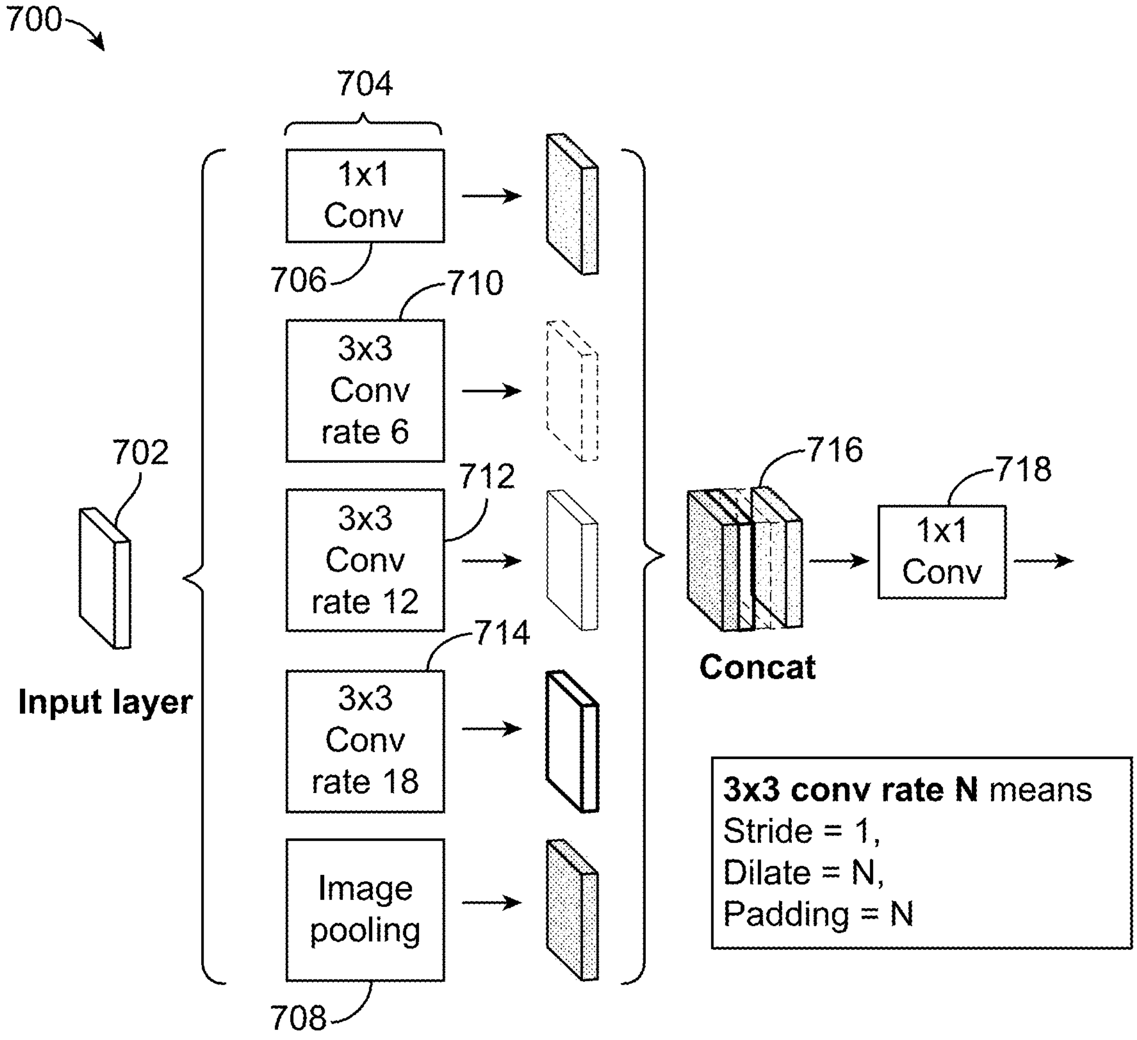
FIG. 7 is a block diagram illustrating operations of an ASPP block, in accordance with aspects of the present disclosure.

FIG. 7 is a block diagram illustrating operations of an ASPP block 700, in accordance with aspects of the present disclosure. In some cases, the ASPP block 700 may be substantially similar to ASPP block 622 of FIG. 6. As shown in FIG. 7, output from an average pooling block, such as average pooling layer 604 of FIG. 6, may be passed to an input layer 702 of the ASPP block 700. The ASPP block 700 may enlarge the receptive field at different rates using a pyramid structure 704 by performing different operations on the input using multiple paths through the pyramid structure 704. For example, a top 706 path through the pyramid structure 704 may perform a 1×1 convolution on the input feature and the bottom path 708 may perform a 1×1 convolution on the globally pooled feature. Other paths through the pyramid structure 704 may perform a 3×3 convolution with different dilation rates (e.g., 6 in the second path 710, 12 in the third path 712, and 18 in the fourth path 714) to generate different sets of convolved 3D features. Different dilation rates may expand the convolutional kernel by inserting holes between consecutive elements to expand the features at different rates. The different rates of expansion may make the different paths sensitive to different object scales. The output (e.g., sets of convolved 3D features) of the different paths through the pyramid structure 704 may then be concatenated to generate a concatenated set of convolved 3D features 716. The concatenated sets of convolved 3D features 716 may be convolved 718 (e.g., encoded) for output. In some cases, the SC-pyramid block, such as SC-pyramid block 600 of FIG. 6, may be more computational expensive as compared to a single SC-conv block. However, the SC-pyramid block 600 may encode the input data more effectively as compared to the SC-cony block. In some cases, fewer SC-pyramid blocks 600 may be used as compared to the number of SC-cony block used to achieve an equivalent accuracy. For example, 4 SC-pyramid blocks may be equivalent to 6 SC-cony blocks.

Figure 8:
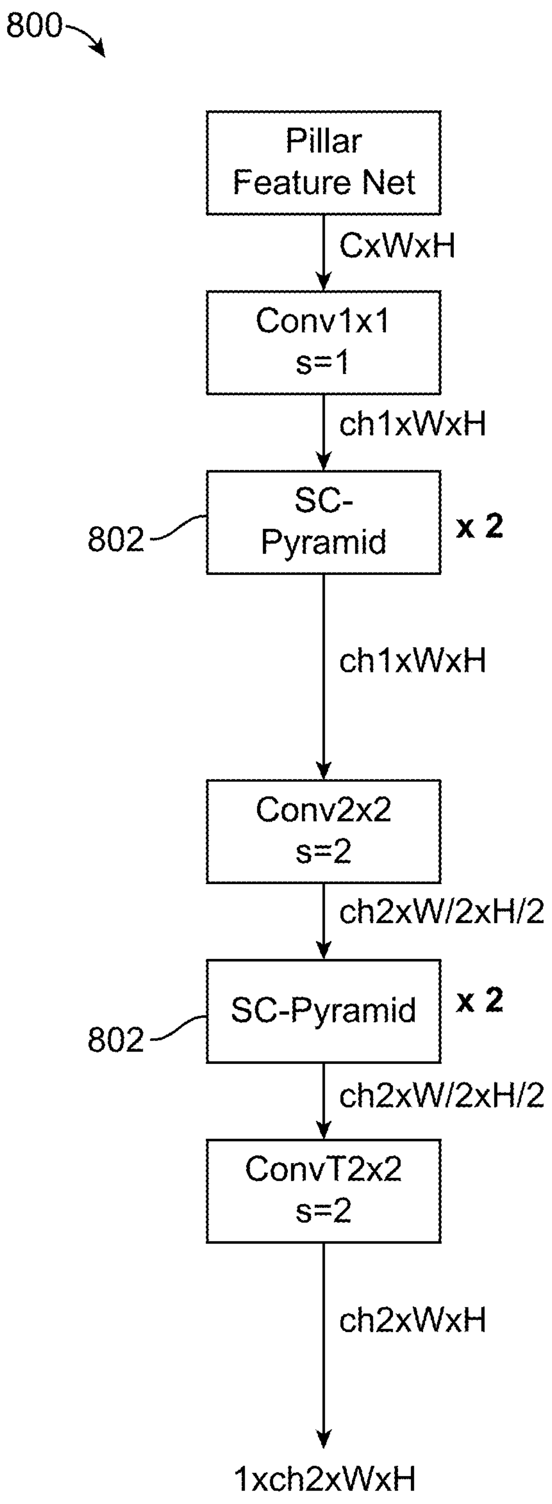
FIG. 8 illustrates a stack of SC-pyramid blocks, in accordance with aspects of the present disclosure.

FIG. 8 illustrates a stack 800 of SC-pyramid blocks, in accordance with aspects of the present disclosure. In some cases, the stack 800 of SC-pyramid blocks may be used as a part of a pillar-based detector following the pillar feature network (e.g., pillar feature network 404 of FIG. 4), before the backbone (e.g., backbone 408 of FIG. 4), and/or integrated into the backbone. For example, the stack 800 of SC-pyramid blocks may form the SCPyramid net 406 of FIG. 4. As shown in FIG. 8, a fewer number of SC-pyramid blocks 802, here two SC-pyramid blocks 802, may replace a larger number of SC-cony blocks, as shown in FIG. 5. In some cases, using a same number of SC-pyramid blocks 802 as SC-cony blocks in a traditional pillar-based detector may yield increased accuracy. Additionally, as SC-pyramid blocks 802 may operate at multiple scales, a concatenation across multiple scales of blocks (e.g., SC-cony blocks, as shown in FIG. 5) may be omitted. Omitting this concatenation step may lead to a decreased channel dimension as the multiple scales (e.g., channels) are not concatenated, which helps reduce computation costs for following layers.

Figure 9:
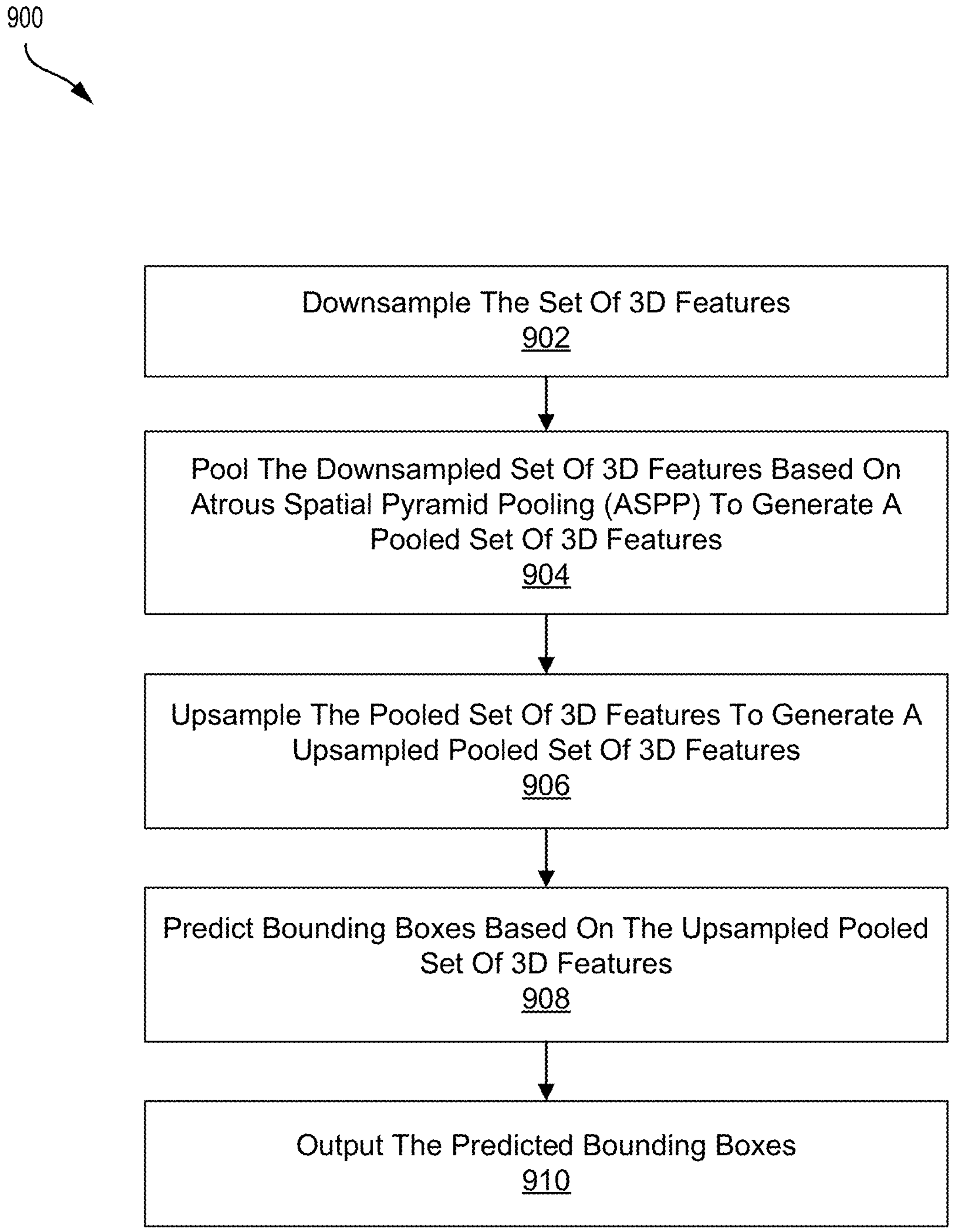
FIG. 9 is a flow diagram illustrating a process for managing computing resources, in accordance with aspects of the present disclosure.

FIG. 9 is a flow diagram illustrating a process 900 for managing computing resources, in accordance with aspects of the present disclosure. The process 900 may be performed by a computing device (or apparatus) (e.g., vehicle 100 of FIG. 1A-1C, wireless communication device 190 of FIG. 1C, computing system 1000 of FIG. 10, etc.) or a component (e.g., a chipset, codec, etc., such as control unit 140 of FIGS. 1A-1C, SOC 105 of FIG. 1D, processor 1010 of FIG. 10, etc.) of the computing device. The computing device may be a mobile device (e.g., a vehicle, mobile phone, etc.), a network-connected wearable such as a watch, an extended reality (XR) device such as a virtual reality (VR) device or augmented reality (AR) device, a vehicle or component or system of a vehicle, or other type of computing device. The operations of the process 900 may be implemented as software components that are executed and run on one or more processors.

At block 902, the computing device (or component thereof) may downsample the set of 3D features (e.g., by an average pooling layer). In some cases, the computing device (or component thereof) may downsample the set of 3D features by determining an average value for a portion of the set of 3D features; and downsampling the set of 3D features based on the average value for the portion of the set of 3D features. In some examples, the set of 3D features are generated based on an obtained 3D point cloud. In some cases, the set of 3D features may be a pseudo-image. In some examples, the set of 3D features may be a set of 3D BEV images. In some cases, the 3D point cloud comprises a lidar point cloud. In some examples, to generate the set of 3D features (e.g., by pillar feature net 404 of FIG. 4), the at least one processor is configured to: discretize the 3D point cloud into an evenly spaced grid; represent points in a cell of the grid as a pillar; and generate a feature based on the pillar.

At block 904, the computing device (or component thereof) may pool the downsampled set of 3D features based on Atrous Spatial Pyramid Pooling (ASPP) (e.g., by an ASPP layer) to generate a pooled set of 3D features. In some cases, the computing device (or component thereof) may pool the downsampled set of 3D features based on ASPP by convolving the set of 3D features using a pyramid structure (e.g., pyramid structure 704). In some examples, the pyramid structure convolves the set of 3D features at multiple dilation rates (e.g., none, 6, 12, 18, as illustrated in FIG. 7) to generate sets of convolved 3D features. In some cases, to pool the downsampled set of 3D features based on ASPP, the at least one processor is configured to: concatenate the sets of convolved 3D features to generate a concatenated set of convolved 3D features (e.g., concatenated 716 of FIG. 7); and convolve (e.g., convolved 718 of FIG. 7) the concatenated set of convolved 3D features. In some cases, the computing device or component thereof may apply channel attention and spatial attention to the set of 3D features (e.g., via sigmoid 616 and convolutional layer 618).

At block 906, the computing device (or component thereof) may upsample the pooled set of 3D features (e.g., by a bilinear upsampling layer) to generate a upsampled pooled set of 3D features.

At block 908, the computing device (or component thereof) may predict bounding boxes (e.g., by a detection head) based on the upsampled pooled set of 3D features.

At block 910, the computing device (or component thereof) may output the predicted bounding boxes.

In some examples, the processes described herein (e.g., process 900 and/or other process described herein) may be performed by the vehicle 100 of FIG. 1A.

In some examples, the techniques or processes described herein may be performed by a computing device, an apparatus, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some cases, the devices or apparatuses configured to perform the operations of the process 900 and/or other processes described herein may include a processor, microprocessor, micro-computer, or other component of a device that is configured to carry out the steps of the process 900 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 900 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 900 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 900 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Figure 10:
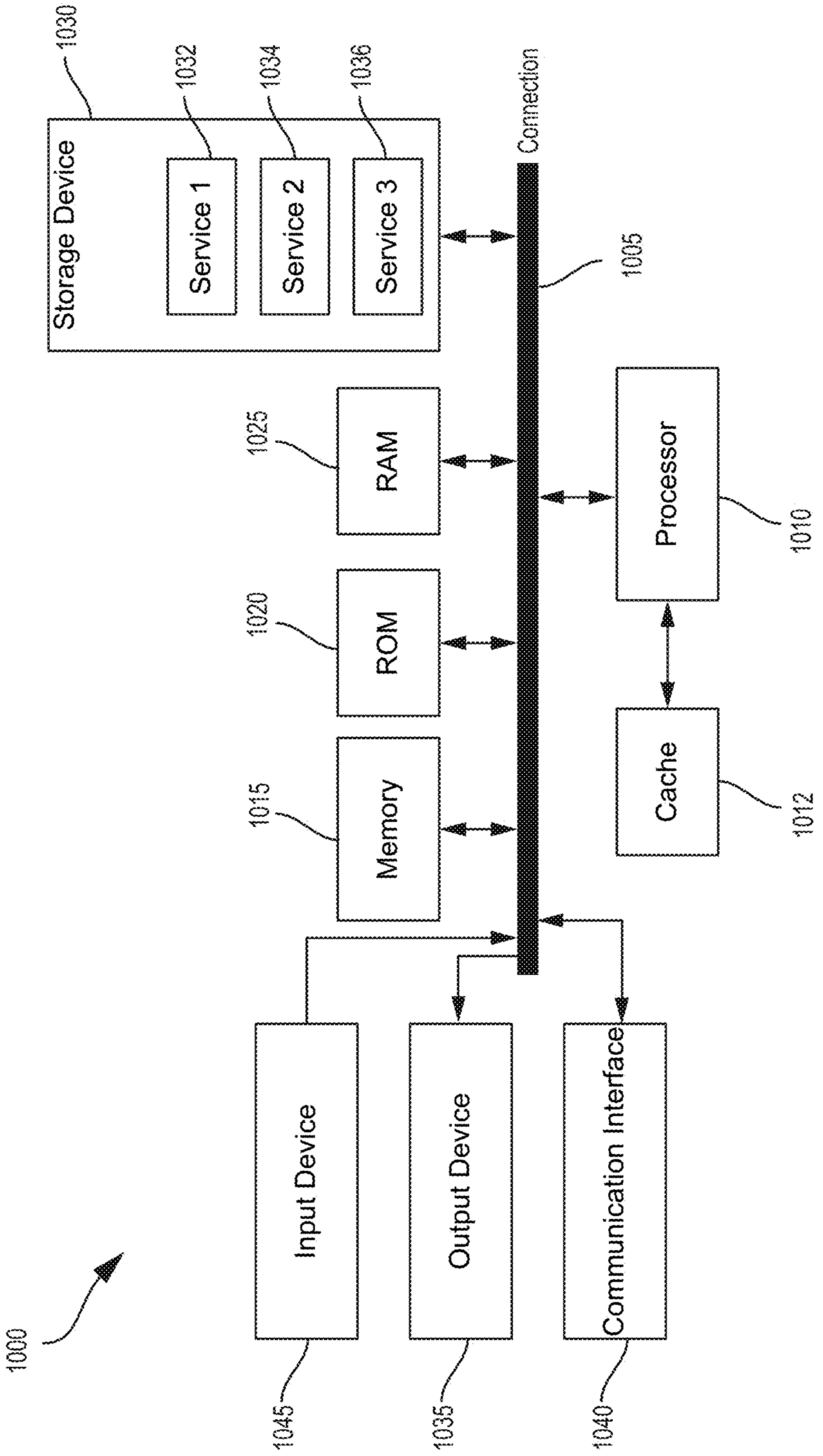
FIG. 10 illustrates an example computing device architecture of an example computing device which can implement techniques described herein.

FIG. 10 is a diagram illustrating an example of a system for implementing certain aspects of the present technology. In particular, FIG. 10 illustrates an example of computing system 1000, which may be for example any computing device making up internal computing system, a remote computing system, a camera, or any component thereof in which the components of the system are in communication with each other using connection 1005. Connection 1005 may be a physical connection using a bus, or a direct connection into processor 1010, such as in a chipset architecture. Connection 1005 may also be a virtual connection, networked connection, or logical connection.

In some embodiments, computing system 1000 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1000 includes at least one processing unit (CPU or processor) 1010 and connection 1005 that communicatively couples various system components including system memory 1015, such as read-only memory (ROM) 1020 and random access memory (RAM) 1025 to processor 1010. Computing system 1000 may include a cache 1012 of high-speed memory connected directly with, in close proximity to, or integrated as part of processor 1010.

Processor 1010 may include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms. In some instances, multimodal systems may enable a user to provide multiple types of input/output to communicate with computing system 1000.

Computing system 1000 may include communications interface 1040, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EE- PROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1030 may include software services, servers, services, etc., that when the code that defines such software is executed by the processor 1010, it causes the system to perform a function. In some embodiments, a hardware service that performs a particular function may include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A method for object detection comprising: receiving a set of 3D features, wherein the set of 3D features are generated based on an obtained 3D point cloud; downsampling the set of 3D features; pooling the downsampled set of 3D features based on Atrous Spatial Pyramid Pooling (ASPP) to generate a pooled set of 3D features; upsampling the pooled set of 3D features to generate a upsampled pooled set of 3D features; predicting bounding boxes based on the upsampled pooled set of 3D features; and outputting the predicted bounding boxes.

Aspect 2. The method of Aspect 1, wherein pooling the downsampled set of 3D features based on ASPP comprises convolving the set of 3D features using a pyramid structure.

Aspect 3. The method of Aspect 2, wherein the pyramid structure convolves the set of 3D features at multiple dilation rates to generate sets of convolved 3D features.

Aspect 4. The method of Aspect 3, wherein pooling the downsampled set of 3D features based on ASPP further comprises: concatenating the sets of convolved 3D features to generate a concatenated set of convolved 3D features; and convolving the concatenated set of convolved 3D features.

Aspect 5. The method of any of Aspects 1-4, wherein downsampling the set of 3D features comprises: determining an average value for a portion of the set of 3D features; and downsampling the set of 3D features based on the average value for the portion of the set of 3D features.

Aspect 6. The method of any of Aspects 1-5, wherein the 3D point cloud comprises a lidar point cloud.

Aspect 7. The method of any of Aspects 1-6, wherein the set of 3D features are generated by: discretizing the 3D point cloud into an evenly spaced grid; representing points in a cell of the grid as a pillar; and generating a feature based on the pillar.

Aspect 8. The method of any of Aspects 1-7, further comprising applying channel attention and spatial attention to the set of 3D features.

Aspect 9. An apparatus for object detection, comprising: at least one memory; and at least one processor coupled to the at least one memory and configured to: receive a set of 3D features, wherein the set of 3D features are generated based on an obtained 3D point cloud; downsample the set of 3D features; pool the downsampled set of 3D features based on Atrous Spatial Pyramid Pooling (ASPP) to generate a pooled set of 3D features; upsample the pooled set of 3D features to generate a upsampled pooled set of 3D features; predict bounding boxes based on the upsampled pooled set of 3D features; and output the predicted bounding boxes.

Aspect 10. The apparatus of Aspect 9, wherein, to pool the downsampled set of 3D features based on ASPP, the at least one processor is configured to convolve the set of 3D features using a pyramid structure.

Aspect 11. The apparatus of Aspect 10, wherein the pyramid structure convolves the set of 3D features at multiple dilation rates to generate sets of convolved 3D features.

Aspect 12. The apparatus of Aspect 11, wherein, to pool the downsampled set of 3D features based on ASPP, the at least one processor is configured to: concatenate the sets of convolved 3D features to generate a concatenated set of convolved 3D features; and convolve the concatenated set of convolved 3D features.

Aspect 13. The apparatus of any of Aspects 9-12, wherein, to downsample the set of 3D features, the at least one processor is configured to: determine an average value for a portion of the set of 3D features; and downsample the set of 3D features based on the average value for the portion of the set of 3D features.

Aspect 14. The apparatus of any of Aspects 9-13, wherein the 3D point cloud comprises a lidar point cloud.

Aspect 15. The apparatus of any of Aspects 9-14, wherein, to generate the set of 3D features, the at least one processor is configured to: discretize the 3D point cloud into an evenly spaced grid; represent points in a cell of the grid as a pillar; and generate a feature based on the pillar.

Aspect 16. The apparatus of any of Aspects 9-15, wherein the at least one processor is further configured to apply channel attention and spatial attention to the set of 3D features.

Aspect 17. A non-transitory computer-readable medium having stored thereon instructions that, when executed by at least one processor, cause the at least one processor to: receive a set of 3D features, wherein the set of 3D features are generated based on an obtained 3D point cloud; downsample the set of 3D features; pool the downsampled set of 3D features based on Atrous Spatial Pyramid Pooling (ASPP) to generate a pooled set of 3D features; upsample the pooled set of 3D features to generate a upsampled pooled set of 3D features; predict bounding boxes based on the upsampled pooled set of 3D features; and output the predicted bounding boxes.

Aspect 18. The non-transitory computer-readable medium of Aspect 17, wherein, to pool the downsampled set of 3D features based on ASPP, the instructions cause the at least one processor to convolve the set of 3D features using a pyramid structure.

Aspect 19. The non-transitory computer-readable medium of Aspect 18, wherein the pyramid structure convolves the set of 3D features at multiple dilation rates to generate sets of convolved 3D features.

Aspect 20. The non-transitory computer-readable medium of Aspect 19, wherein, to pool the downsampled set of 3D features based on ASPP, the instructions cause the at least one processor to: concatenate the sets of convolved 3D features to generate a concatenated set of convolved 3D features; and convolve the concatenated set of convolved 3D features.

Aspect 21. The non-transitory computer-readable medium of any of Aspects 17-20, wherein, to downsample the set of 3D features, the instructions cause the at least one processor to: determine an average value for a portion of the set of 3D features; and downsample the set of 3D features based on the average value for the portion of the set of 3D features.

Aspect 22. The non-transitory computer-readable medium of any of Aspects 17-21 wherein the 3D point cloud comprises a lidar point cloud.

Aspect 23. The non-transitory computer-readable medium of any of Aspects 17-22, wherein, to generate the set of 3D features, the instructions cause the at least one processor to: discretize the 3D point cloud into an evenly spaced grid; represent points in a cell of the grid as a pillar; and generate a feature based on the pillar.

Aspect 24. The non-transitory computer-readable medium of any of Aspects 17-23, wherein the instructions cause the at least one processor to apply channel attention and spatial attention to the set of 3D features.

Aspect 25: An apparatus for object detection, comprising one or more means for performing operations according to any of Aspects 1 to 8.

What is claimed is:

1. A method for object detection comprising:

downsampling a set of 3D features, wherein the set of 3D features are generated based on an obtained 3D point cloud;

pooling the downsampled set of 3D features based on Atrous Spatial Pyramid Pooling (ASPP) to generate a pooled set of 3D features;

applying channel attention and spatial attention to the set of 3D features based on the pooled set of 3D features, wherein the channel attention and the spatial attention assign weights to features of the set of 3D features to generate attention-weighted 3D features;

upsampling the pooled set of 3D features to generate an upsampled pooled set of 3D features;

predicting bounding boxes based on the upsampled pooled set of 3D features and the attention-weighted 3D features; and outputting the predicted bounding boxes.

2. The method of claim 1, wherein pooling the downsampled set of 3D features based on ASPP comprises convolving the set of 3D features using a pyramid structure.

3. The method of claim 2, wherein the pyramid structure convolves the set of 3D features at multiple dilation rates to generate sets of convolved 3D features.

4. The method of claim 3, wherein pooling the downsampled set of 3D features based on ASPP further comprises:

concatenating the sets of convolved 3D features to generate a concatenated set of convolved 3D features; and convolving the concatenated set of convolved 3D features.

5. The method of claim 1, wherein downsampling the set of 3D features comprises:

determining an average value for a portion of the set of 3D features; and downsampling the set of 3D features based on the average value for the portion of the set of 3D features.

6. The method of claim 1, wherein the 3D point cloud comprises a lidar point cloud.

7. The method of claim 1, wherein the set of 3D features are generated by:

discretizing the 3D point cloud into an evenly spaced grid;

representing points in a cell of the grid as a pillar; and generating a feature based on the pillar.

8. The method of claim 1, wherein applying the channel attention and the spatial attention comprises generating the weights using a sigmoid function.

9. An apparatus for object detection, comprising:

at least one memory; and at least one processor coupled to the at least one memory and configured to:

downsample a set of 3D features, wherein the set of 3D features are generated based on an obtained 3D point cloud;

pool the downsampled set of 3D features based on Atrous Spatial Pyramid Pooling (ASPP) to generate a pooled set of 3D features;

apply channel attention and spatial attention to the set of 3D features based on the pooled set of 3D features, wherein the channel attention and the spatial attention assign weights to features of the set of 3D features to generate attention-weighted 3D features;

upsample the pooled set of 3D features to generate an upsampled pooled set of 3D features;

predict bounding boxes based on the upsampled pooled set of 3D features and the attention-weighted 3D features; and output the predicted bounding boxes.

10. The apparatus of claim 9, wherein, to pool the downsampled set of 3D features based on ASPP, the at least one processor is configured to convolve the set of 3D features using a pyramid structure.

11. The apparatus of claim 10, wherein the pyramid structure convolves the set of 3D features at multiple dilation rates to generate sets of convolved 3D features.

12. The apparatus of claim 11, wherein, to pool the downsampled set of 3D features based on ASPP, the at least one processor is configured to:

concatenate the sets of convolved 3D features to generate a concatenated set of convolved 3D features; and convolve the concatenated set of convolved 3D features.

13. The apparatus of claim 9, wherein, to downsample the set of 3D features, the at least one processor is configured to:

determine an average value for a portion of the set of 3D features; and downsample the set of 3D features based on the average value for the portion of the set of 3D features.

14. The apparatus of claim 9, wherein the 3D point cloud comprises a lidar point cloud.

15. The apparatus of claim 9, wherein, to generate the set of 3D features, the at least one processor is configured to:

discretize the 3D point cloud into an evenly spaced grid;

represent points in a cell of the grid as a pillar; and generate a feature based on the pillar.

16. The apparatus of claim 9, wherein, to apply the channel attention and the spatial attention to the set of 3D features, the at least one processor is configured to generate the weights using a sigmoid function.

17. A non-transitory computer-readable medium having stored thereon instructions that, when executed by at least one processor, cause the at least one processor to:

downsample a set of 3D features, wherein the set of 3D features are generated based on an obtained 3D point cloud;

pool the downsampled set of 3D features based on Atrous Spatial Pyramid Pooling (ASPP) to generate a pooled set of 3D features;

apply channel attention and spatial attention to the set of 3D features based on the pooled set of 3D features, wherein the channel attention and the spatial attention assign weights to features of the set of 3D features to generate attention-weighted 3D features;

upsample the pooled set of 3D features to generate an upsampled pooled set of 3D features;

predict bounding boxes based on the upsampled pooled set of 3D features and the attention-weighted 3D features; and output the predicted bounding boxes.

18. The non-transitory computer-readable medium of claim 17, wherein, to pool the downsampled set of 3D features based on ASPP, the instructions cause the at least one processor to convolve the set of 3D features using a pyramid structure.

19. The non-transitory computer-readable medium of claim 18, wherein the pyramid structure convolves the set of 3D features at multiple dilation rates to generate sets of convolved 3D features.

20. The non-transitory computer-readable medium of claim 19, wherein, to pool the downsampled set of 3D features based on ASPP, the instructions cause the at least one processor to:

concatenate the sets of convolved 3D features to generate a concatenated set of convolved 3D features; and convolve the concatenated set of convolved 3D features.

* * * * *